(12) United States Patent
Koistinen

(10) Patent No.: US 6,799,744 B1
(45) Date of Patent: Oct. 5, 2004

(54) CLIP STRUCTURE FOR SUPPORTING ORNAMENTAL ITEMS ON A PEW SUPPORT

(75) Inventor: Stevan A. Koistinen, Watertown, SD (US)

(73) Assignee: Dakota Plastics Company, Watertown, SD (US)

( * ) Notice: Subject to any disclaimer, the term of this patent is extended or adjusted under 35 U.S.C. 154(b) by 0 days.

(21) Appl. No.: 10/016,990

(22) Filed: Dec. 14, 2001

(51) Int. Cl.[7] ............................................... A01G 5/00
(52) U.S. Cl. ........................... 248/227.3; 248/218.4; 248/219.1; 248/219.2; 248/219.4; 248/226.11; 248/227.1; 248/231.81; 47/67; 47/41.01
(58) Field of Search .................. 248/218.4, 219.1, 248/219.2, 219.4, 226.11, 227.1, 227.3, 231.81; 47/67, 41.01

(56) References Cited

U.S. PATENT DOCUMENTS

| | | | |
|---|---|---|---|
| 1,368,868 A | | 2/1921 | Wertman |
| 1,441,505 A | | 1/1923 | Huscher |
| 2,049,061 A | | 7/1936 | Hoegger |
| 2,076,941 A | * | 4/1937 | Farr ............................ 211/43 |
| 2,506,859 A | * | 5/1950 | Des Saulles ................ 132/331 |
| 3,027,014 A | * | 3/1962 | Lindblom ................ 211/85.23 |
| 3,247,558 A | | 4/1966 | Kaufman |
| 3,511,461 A | * | 5/1970 | Clark ......................... 248/27.8 |
| 4,032,100 A | * | 6/1977 | Kahn ........................... 248/211 |
| 4,417,712 A | * | 11/1983 | DeHart .................. 248/220.22 |
| 4,418,496 A | | 12/1983 | Koistinen |
| 4,739,582 A | | 4/1988 | Cullinane |
| 4,825,590 A | | 5/1989 | Cullinane |
| 4,928,864 A | * | 5/1990 | Walker et al. .............. 224/162 |
| 5,072,542 A | * | 12/1991 | Quackenbush ............. 47/41.01 |
| 5,215,236 A | * | 6/1993 | Waddell ...................... 224/218 |
| 5,871,189 A | | 2/1999 | Hoftman |
| 5,934,016 A | | 8/1999 | Jones |

* cited by examiner

Primary Examiner—Leslie A. Braun
Assistant Examiner—I W
(74) Attorney, Agent, or Firm—Kaardal & Leonard, L.L.P.

(57) ABSTRACT

A clip structure for supporting ornamental items on a pew support includes a mounting portion for gripping a portion of a pew support. The mounting portion has a pair of opposite inner and outer faces, a pair of side edges, and a pair of end edges. The mounting portion includes an elongate longitudinal extent having opposite end regions, a pair of transverse extents each extending from one of the end regions of the longitudinal extent in a generally transverse orientation to the longitudinal extent, a pair of return extents each extending from one of the transverse extents, with each of the return extents extending towards each other. The mounting portion includes a pair of free end extents each extending from one of the return extents. Optionally, the clip includes a securing portion mounting on the mounting portion for removably securing an ornamental item on the mounting portion.

14 Claims, 13 Drawing Sheets

CLIP STRUCTURE FOR SUPPORTING ORNAMENTAL ITEMS ON A PEW SUPPORT

BACKGROUND OF THE INVENTION

1. Field of the Invention

The present invention relates to support structures for ornamental items and more particularly pertains to a new clip structure for supporting ornamental items on a pew support in a manner that adapts easily to a variety of pew support sizes and is easily mountable on and removable from the pew support without marring the pew.

2. Description of the Prior Art

The use of support structures for temporarily attaching ornamental items, such as flower arrangements, ribbons, bows, and the like, to the ends of pews or benches is known. One example of known support clips is disclosed in U.S. Pat. No. 4,418,496. While this type of generally U-shaped support structure is highly useful, especially for use on pews having relatively thick and generally broad end supports, it is not as useful and functional on pew end supports that are relatively thinner in thickness and width. The known support structures are hampered by their inability to fit on a wide range of pew supports having different dimensions, such that the support structures may be easily reused in different churches or facilities without having to utilize different size support structures for different pew designs;

In these respects, the clip structure for supporting ornamental items on a pew support according to the present invention substantially departs from the conventional concepts and designs of the prior art, and in so doing provides a device primarily developed to adapt easily to a variety of pew support sizes and to be easily mountable on and removable from the pew support without marring the pew

SUMMARY OF THE INVENTION

The present invention provides a new clip structure for supporting ornamental items on a pew support wherein the same can be utilized in a manner that adapts easily to a variety of pew support sizes and is easily removable from the pew support without marring the pew.

To attain these advantages, the present invention generally comprises a mounting portion for gripping a portion of a pew support. The mounting portion has a pair of opposite inner and outer faces, a pair of side edges, and a pair of end edges. The mounting portion includes an elongate longitudinal extent having opposite end regions, a pair of transverse extents each extending from one of the end regions of the longitudinal extent in a generally transverse orientation to the longitudinal extent, a pair of return extents each extending from one of the transverse extents, with each of the return extents extending towards each other. The mounting portion includes a pair of free end extents each extending from one of the return extents. Optionally, the clip includes a securing portion mounting on the mounting portion for removably securing an ornamental item on the mounting portion.

The clip structure of the invention is highly adaptable for mounting on different types of pew end supports, such as end supports with relatively thin thicknesses for which clips that mount over the top of the end support are not suitable. The clip structure of the invention is easily mounted on and removed from the pew end support, and grips the end support in a manner that does not damage the wood of the end support.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
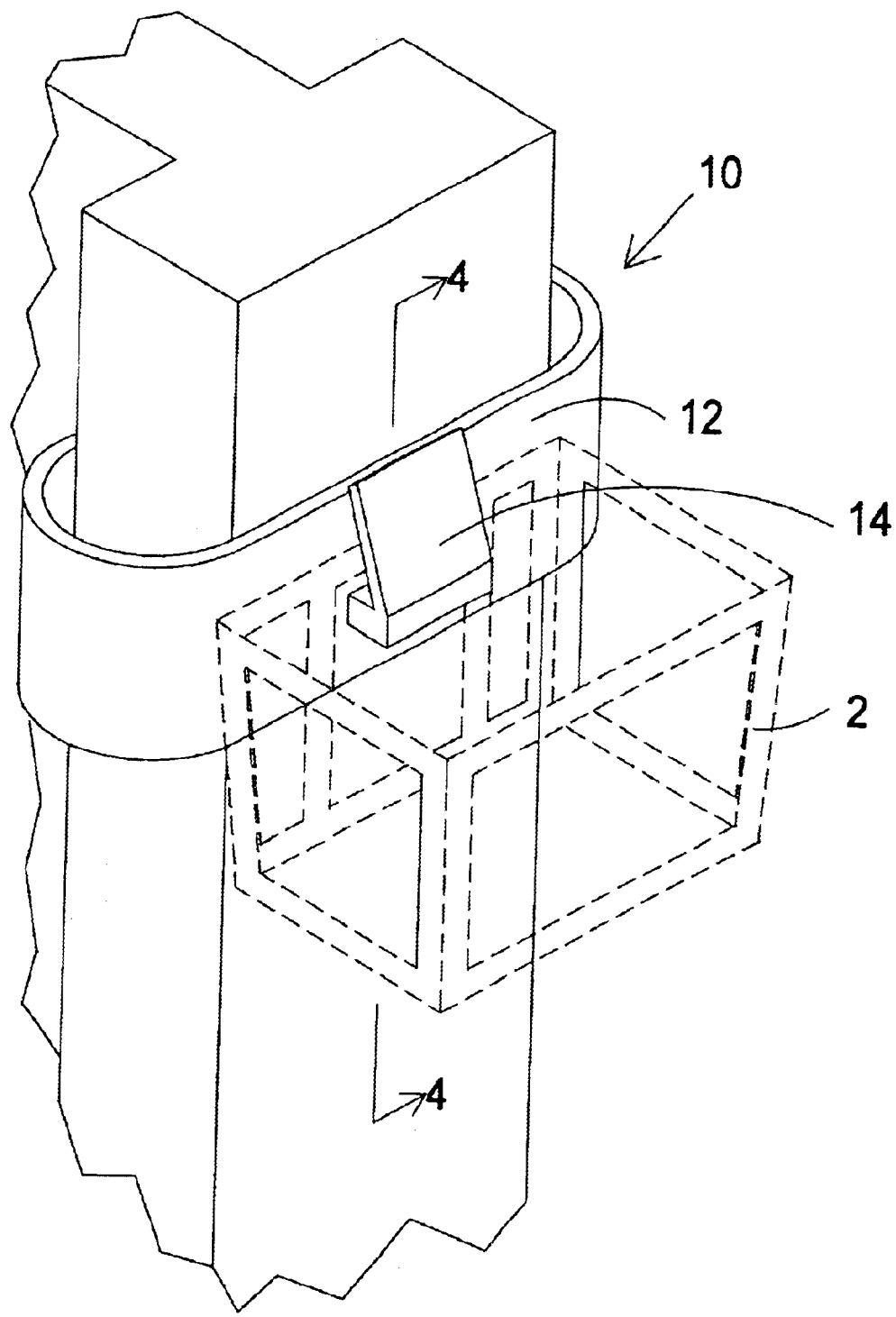
FIG. 1 is a schematic perspective view of a new clip structure according to the present invention shown mounted on a pew end support and shown supporting a basket into which ornamental items may be inserted.
Figure 2:
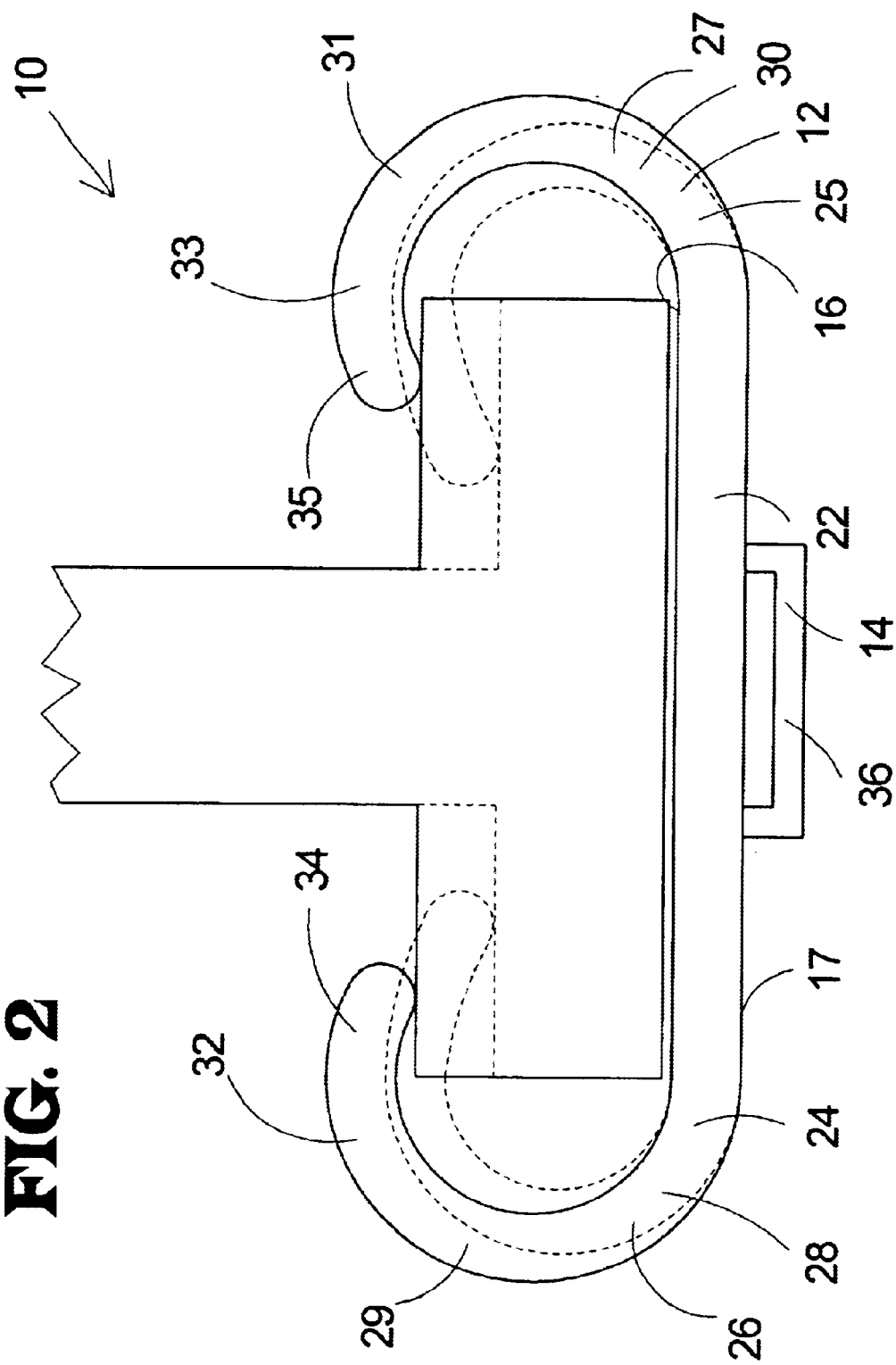
FIG. 2 is a schematic top view of the present invention showing the clip structure mounted on a relatively thick pew support and showing (in phantom lines) the clip structure mounted on a relatively thin pew support.
Figure 3:
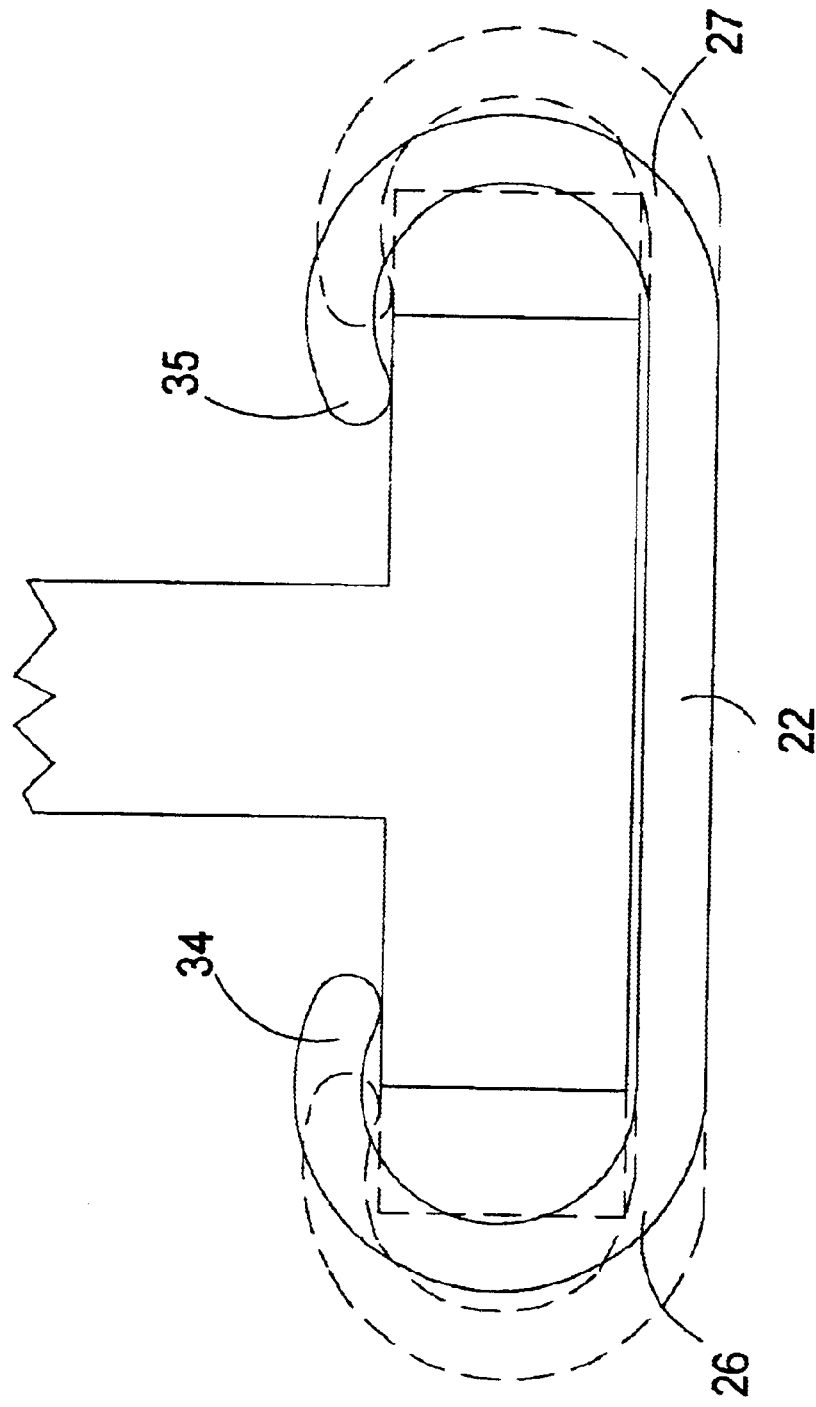
FIG. 3 is a schematic top view of the present invention showing the clip structure mounted on a relatively narrow pew support and showing (in phantom lines) the clip structure mounted on a relatively wide pew support.
Figure 4:
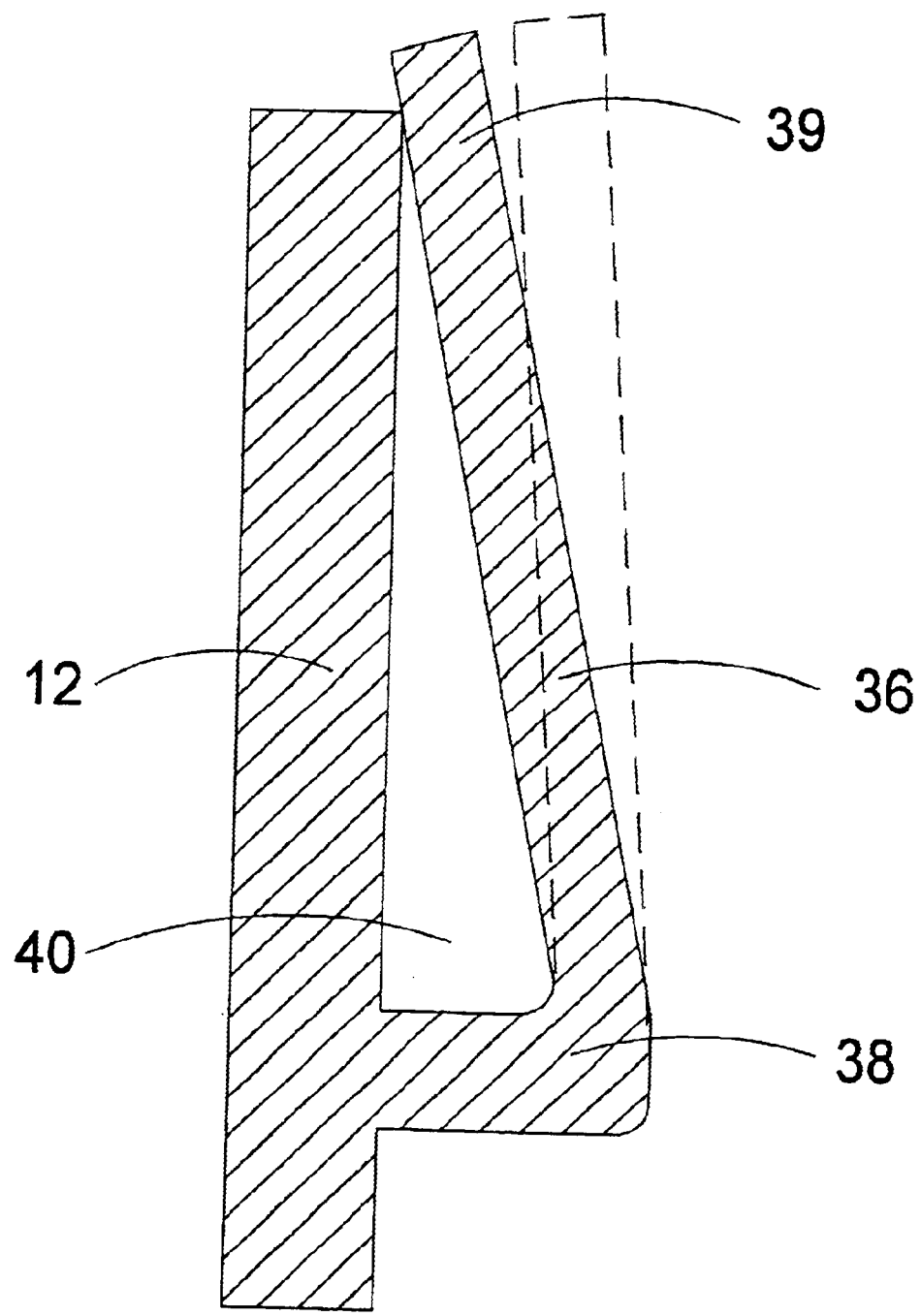
FIG. 4 is a schematic sectional view of the present invention taken along line 4—4 of FIG. 1.
Figure 5:
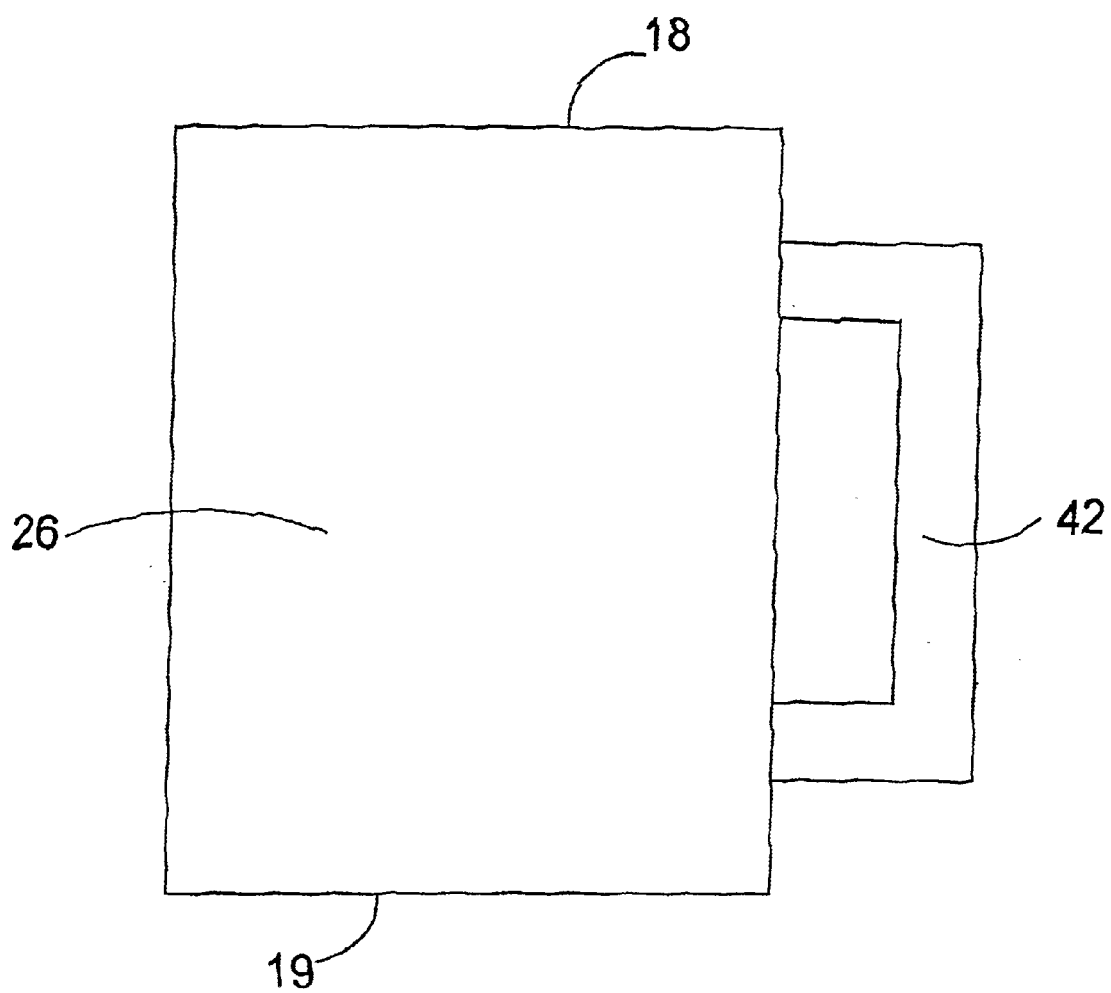
FIG. 5 is a schematic side view of the present invention showing an optional loop member securing structure.
Figure 6:
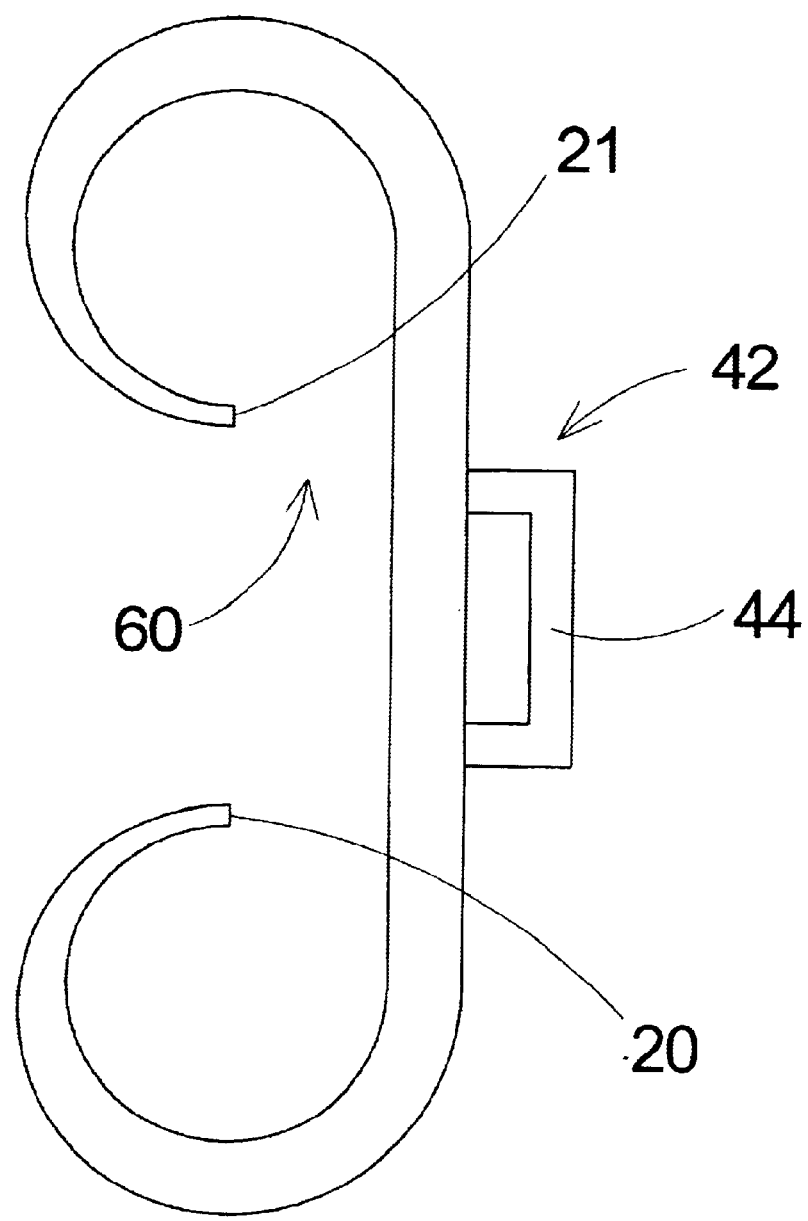
FIG. 6 is a schematic top view of the present invention showing an optional loop member securing structure and also showing an optional tapering of the thickness of the end regions of the mounting portion.
Figure 7:
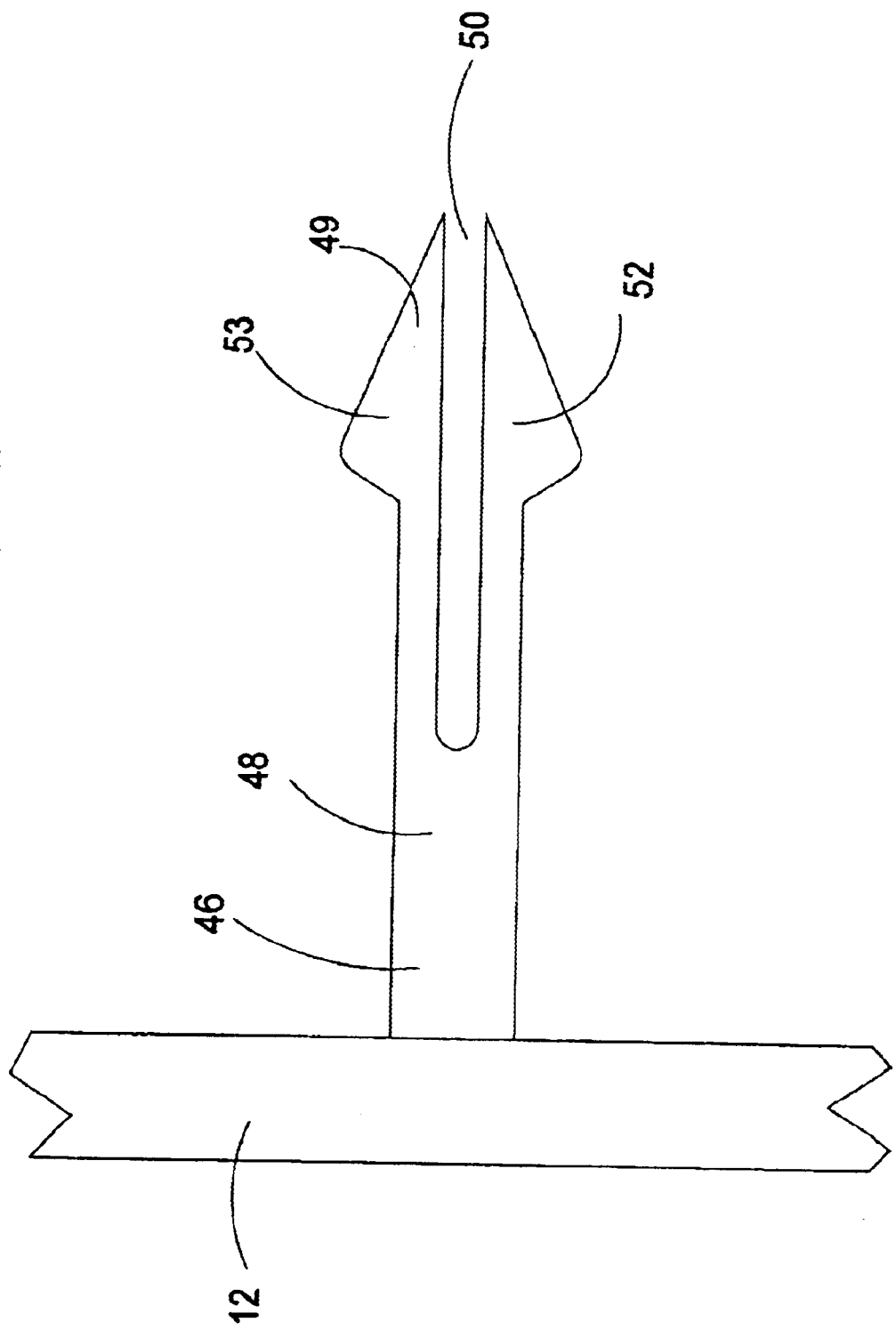
FIG. 7 is a schematic top view of a portion of the present invention showing an optional stud member securing structure.
Figure 8:
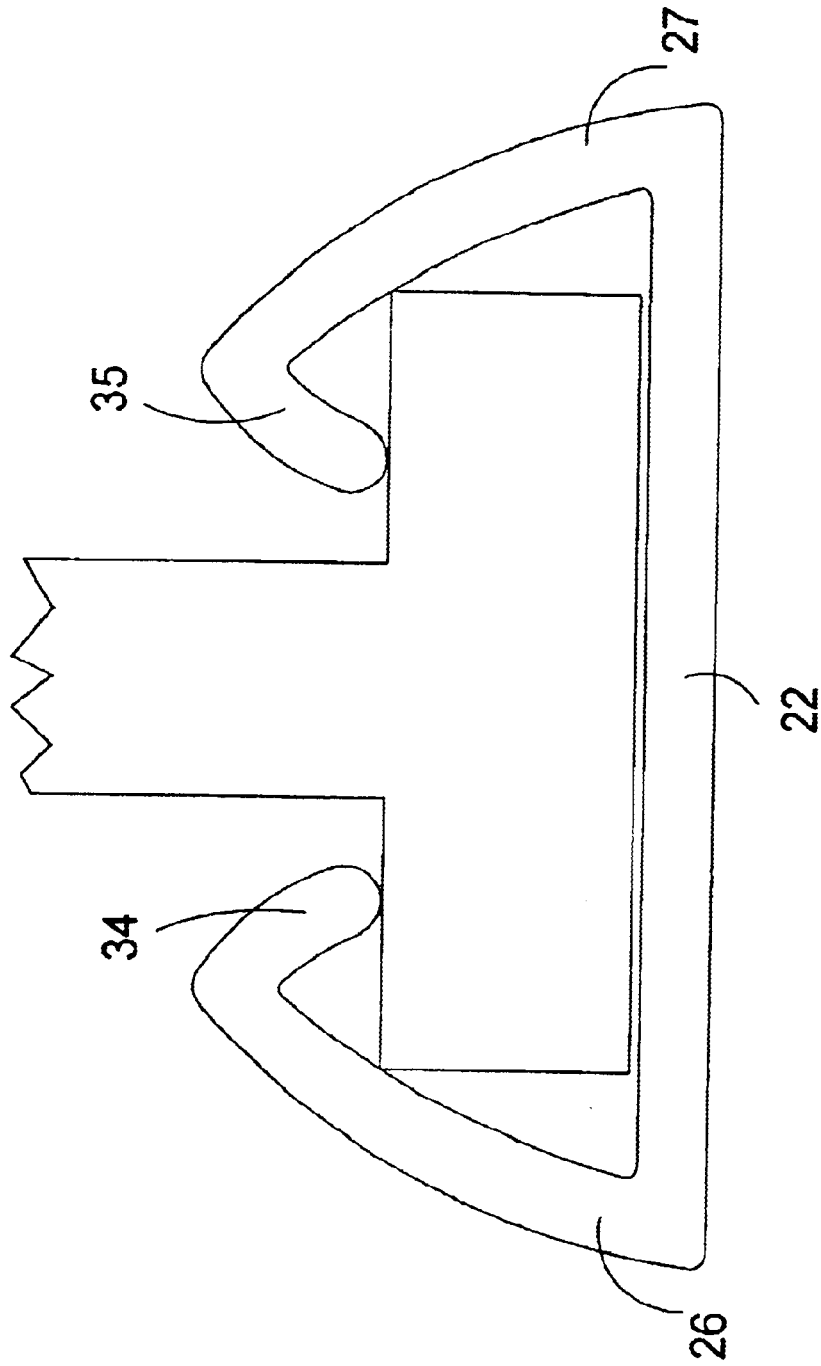
FIG. 8 is a schematic top view of an optional configuration of the clip structure of the present invention.

With reference now to the drawings, and in particular to FIGS. 1 through 13 thereof, a new clip structure for supporting ornamental items on a pew support that embodies the principles and concepts of the present invention and generally designated by the reference numeral 10 will be described.

The clip structure 10 of the invention generally comprises a mounting portion 12 and may also include a securing portion 14. The clip structure may be employed to mount a variety of ornamental items on a pew end support, including, for example, a basket 2 that receives ornamental items such as flowers.

The mounting portion 12 of the invention is provided for gripping a portion of a pew support. The mounting portion has a pair of opposite faces 16, 17 including an inner face 16 and an outer face 17. The mounting portion may have a substantially uniform width, and may have a substantially uniform thickness. The mounting portion may be formed of a resiliently flexible material. The mounting portion 12 may have a pair of side edges 18, 19. The pair of side edges 18, 19 may be oriented substantially parallel to each other. The mounting portion may also have a pair of end edges 20, 21. The pair of end edges may each extend substantially perpendicularly to the side edges 18, 19.

The mounting portion 12 may be conceptually divided into a number of extents or segments, although the mounting portion is, in one of the most preferred embodiments, formed of a single piece of material. The mounting portion includes an elongate longitudinal extent 22 that has opposite end regions 24, 25. The longitudinal extent may be substantially planar. The mounting portion may also include a pair of transverse extents 26, 27. Each of the transverse extents 26, 27 extend from one of the end regions 24, 25 of the longitudinal extent in a generally transverse orientation to the longitudinal extent. The pair of transverse extents 26, 27 extend outwardly from the inner face 16 of the longitudinal extent 22. Each of the transverse extents may have an arcuate configuration. Each of the transverse extents 26, 27 may have opposite end regions 28, 29, 30, 31. A first one 28, 30 of the end regions of each of the transverse extents is joined to one of the end regions 24, 25 of the longitudinal extent. The mounting portion may also include a pair of return extents 32, 33. Each of the return extents extends from one of the transverse extents 26, 27. Each of the return extents may extend towards the other return extent, and may extend generally parallel to the longitudinal extent 22. Each of the return extents extends from a second one 32, 31 of the end regions of one of the transverse extents. Each of the return extents may be generally arcuate.

The mounting portion may also include a pair of free end extents 34, 35. Each of the free end extents extends from one of the return extents 32, 33. Each of the free end extents may extend inwardly from one of the return extents and toward the longitudinal extent. Each of the free end extents may be oriented substantially perpendicular to the longitudinal extent. Each of the end edges 20, 21 of the mounting portion 12 is located on one of the free end extents. A gap 60 may be formed between the end edge 20, 21 on the free end extent and the longitudinal extent 12.

Significantly, the preferred resilient flexibility of the material of the mounting portion permits the gap 60 to be expanded to accommodate the particular thickness of the pew support on which the mounting portion is positioned. Further, the greater the degree of the expansion of the gap to accommodate the pew support, the greater the degree of pinching force exerted by the end edges on the pew support. The orientation of the free end extents at a substantially perpendicular orientation to the longitudinal extent concentrates the pinching pressure exerted by the mounting member on the pew support at the end edges, which have a relatively small area for increased holding capability. In one embodiment of the invention, a distance of the gap being approximately one-half of a distance of a farthest extent of the return extents from the longitudinal extent.

Figure 9:
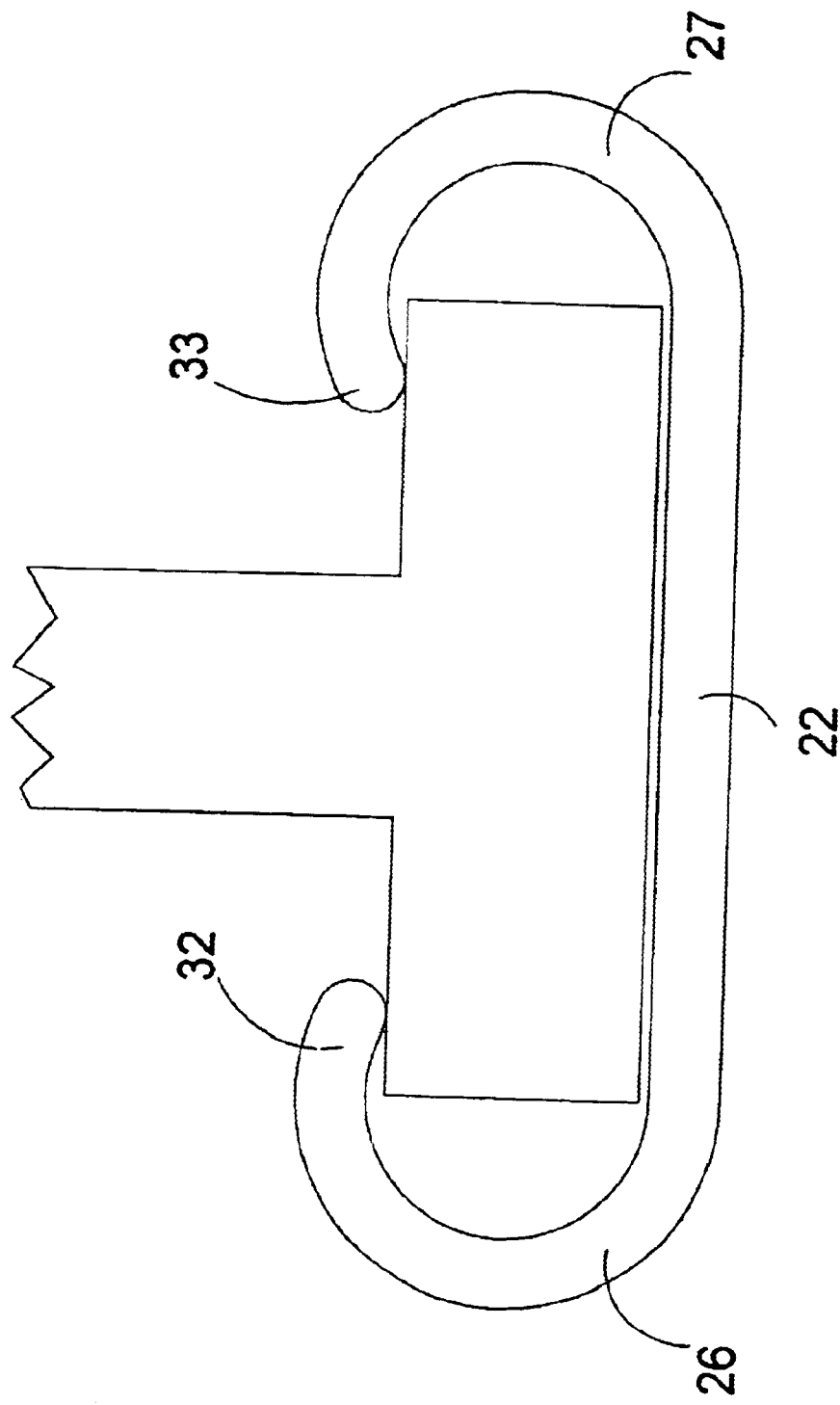
FIG. 9 is a schematic top view of another optional configuration of the clip structure of the present invention.
Figure 10:
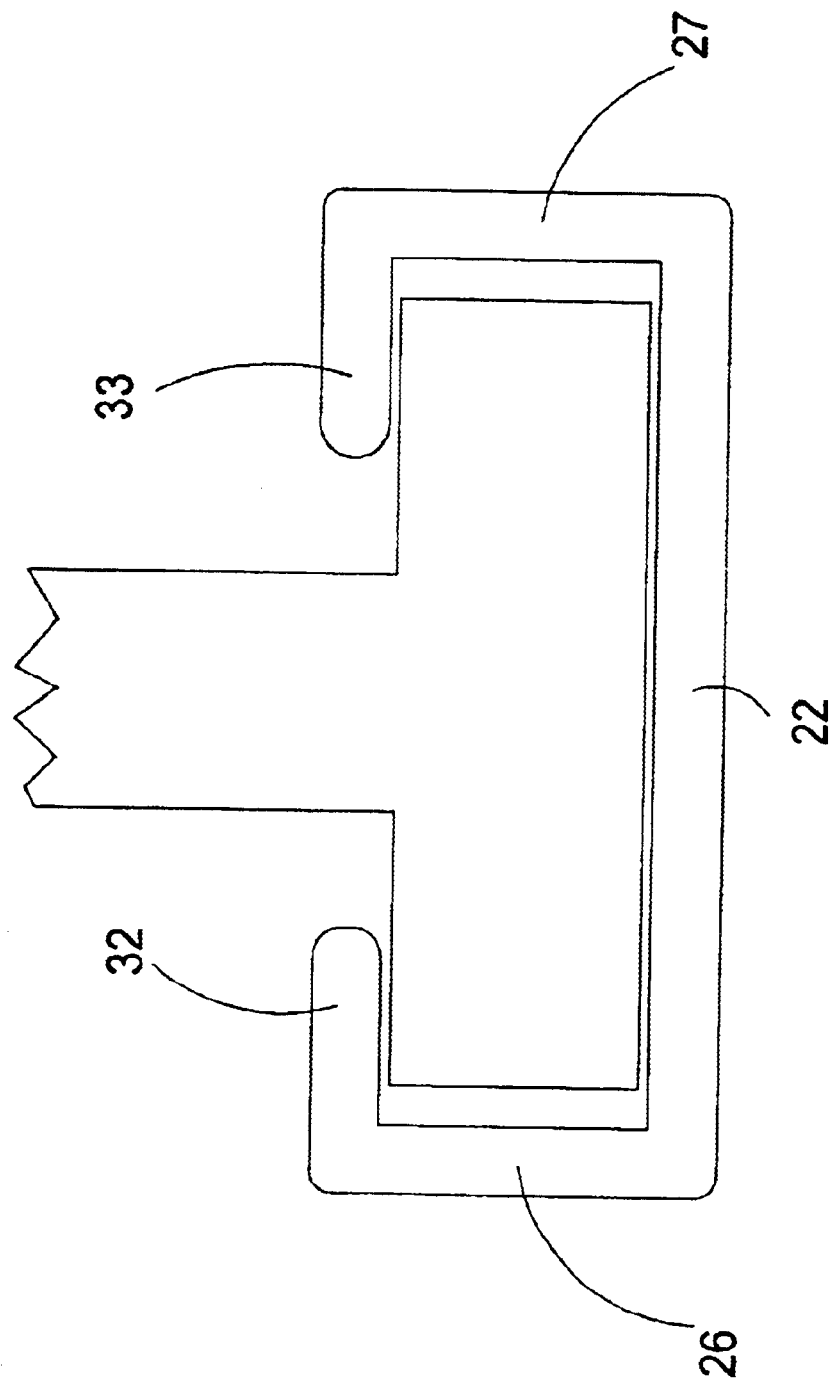
FIG. 10 is a schematic top view of yet another optional configuration of the clip structure of the present invention.
Figure 11:
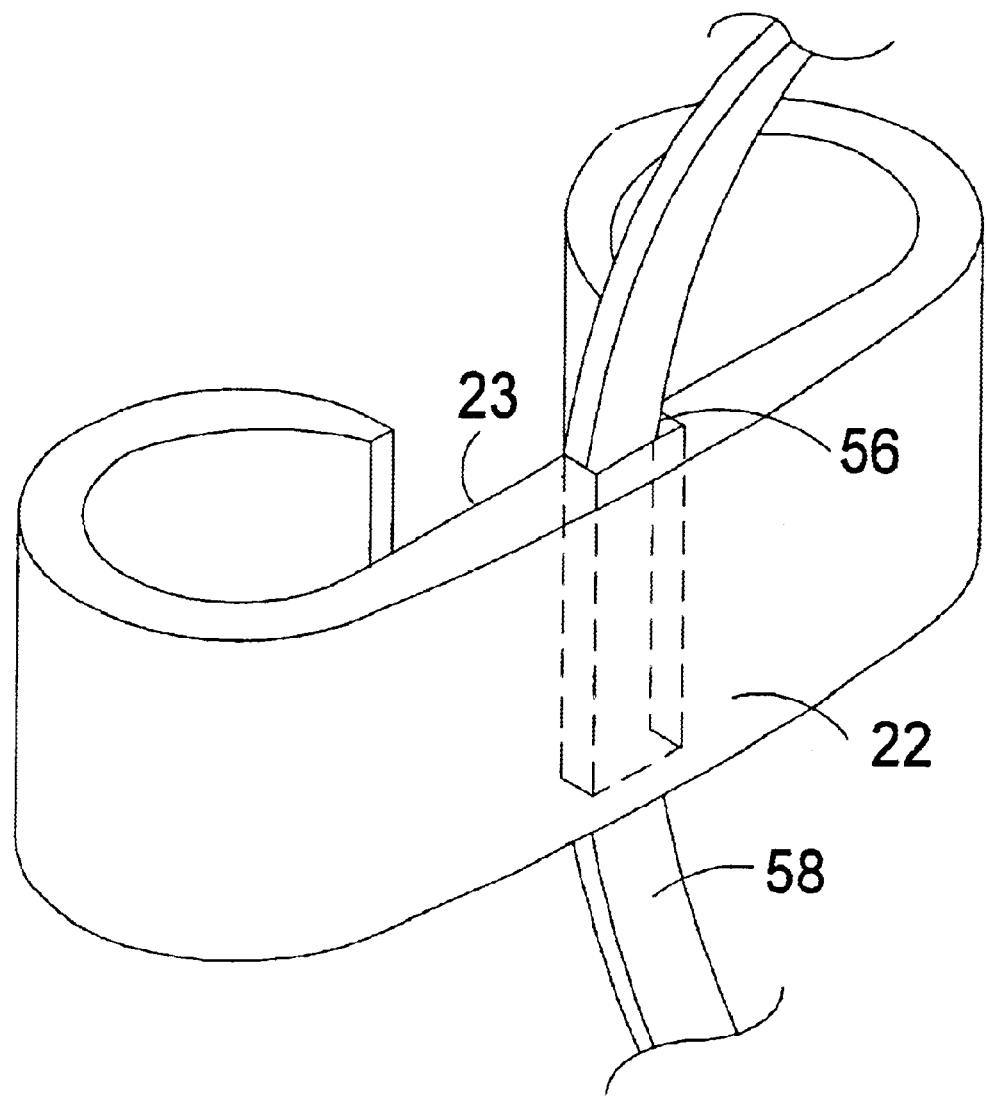
FIG. 11 is a schematic perspective view of still another optional configuration of the clip structure of the present invention.
Figure 12:
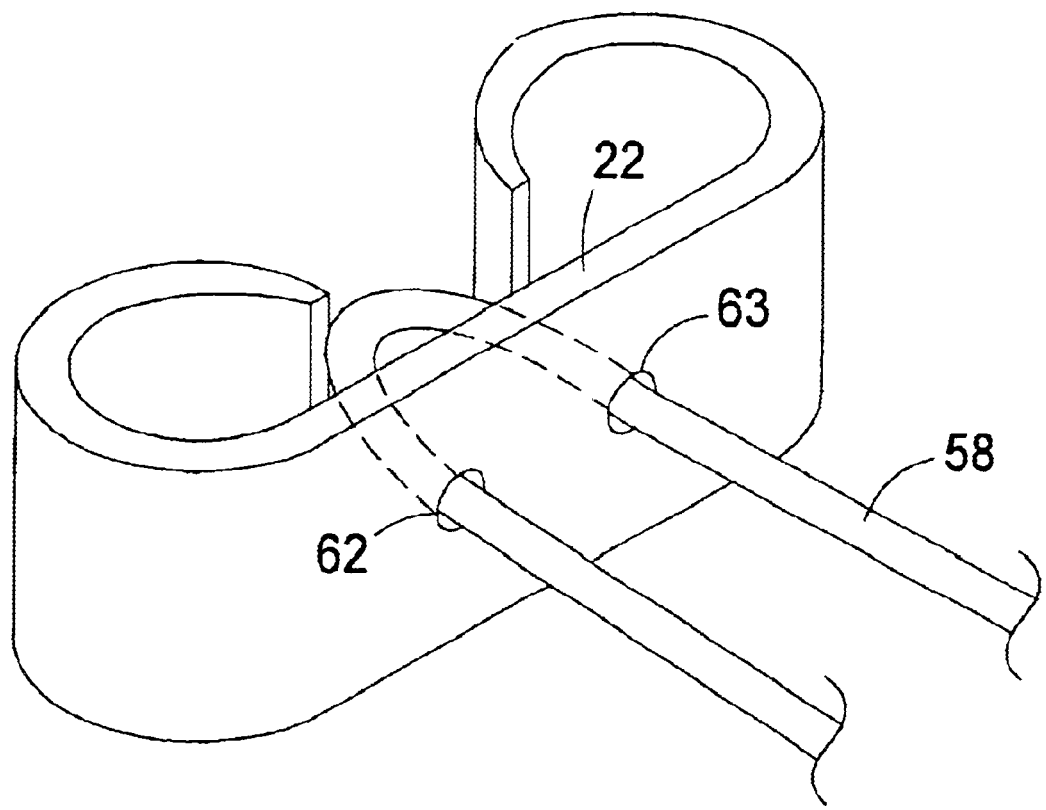
FIG. 12 is a schematic perspective view of another optional configuration of the clip structure of the present invention.
Figure 13:
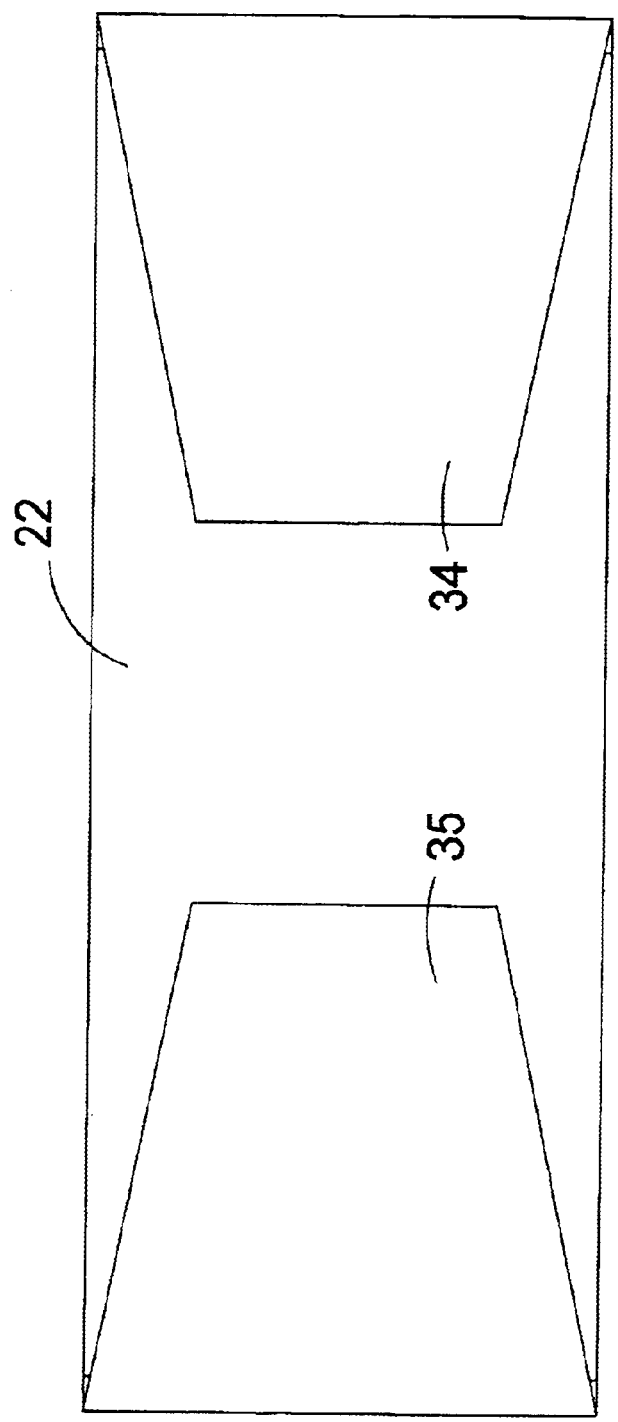
FIG. 13 is a schematic perspective view of an optional configuration having end portions with a tapering width toward the ends.

In some optional configurations of the invention, the mounting portion 12 may only include the longitudinal, transverse, and return extents (see FIGS. 9 and 10). In these optional configurations, the transverse extents may be arcuate (see FIG. 9) or planar (see FIG. 10). However, these configurations are most suitable where the thickness of the pew support does not vary, so that the distance between the longitudinal and return portions may be fixed to approximate that thickness. In another other optional configuration of the invention, the mounting portion includes the longitudinal, transverse, and free end extents (see FIG. 8). The transverse and free end extents are each substantially planar, with the plane of the transverse extent being oriented at an acute angle to the plane of the free end extent. The end edges are oriented to contact against the pew support when the pew support is inserted between the free end extents and the longitudinal extent. Although each of these optional configurations is suitable for the intended purpose, none is especially adaptable to pew supports having a variety of widths.

The securing portion 14 of the invention may be provided for removably securing an ornamental item on the mounting portion 12. The securing portion 14 may be mounted on the outer face 17 of the mounting portion. In one embodiment of the invention, the securing portion 14 may comprise a securing arm 36 for holding a portion of an ornamental item against the mounting portion. The securing arm 36 has a first end 38 that is mounted on the mounting portion 12 and a second end 39 that is generally free of any connection to the mounting portion. The securing arm 36 may extend generally parallel to the outer face 17 of the mounting portion (see the phantom lines in FIG. 4), but more preferably the securing arm extends toward the outer face to form a channel 40 therebetween for receiving a portion of an ornamental item. Further, the second end 39 of the securing arm 36 may extend beyond the side edge 18 of the mounting portion to thereby facilitate insertion of items between the securing arm and the mounting portion by permitting engagement of the second end by the user's finger or a portion of the item to be inserted to pull the second end away from the mounting portion.

In one embodiment of the invention, the securing portion forms a loop 42 for extending about a portion of an ornamental item. The securing portion includes a loop member 44 that has opposite ends that are each mounted on the mounting portion. In one optional configuration of the securing portion, the loop member 44 has a longitudinal axis extending substantially parallel to the longitudinal axis of the longitudinal portion. In another optional configuration of the securing portion, the loop member 44 has a longitudinal axis extending substantially perpendicular to the longitudinal axis of the longitudinal portion.

In one embodiment of the invention, the securing portion comprises a stud member 46 that extends from the mounting member 12. The stud member 46 may have a first section 48 and a second section 49. The first section 48 of the stud member may have a first thickness dimension and the second section 49 may have a second thickness dimension, with the second thickness dimension being greater than the first thickness dimension. The stud member may have a slot 50 that extends through the stud member and that extends along a portion of a length of the stud member to define spaced portions such that deflecting the first 52 and second 53 portions of the stud member toward each other partially closes the slot 50 and reduces a thickness of the stud member while the portions 52, 53 are deflected and prior to recovery by the portions, The deflected dimension of the stud member may permit the stud member to be inserted into an aperture in an ornamental item with the second section fitting through the aperture, and recovery of the positions of the first and second portions may prevent the second section from being withdrawn from the aperture in the ornamental item. The stud member may extend substantially perpendicular to the outer face of the mounting member.

In one embodiment of the invention (see FIG. 11), the securing portion may include a transverse groove 56 formed in an inner face 23 of the longitudinal extent 22 of the mounting portion, and also includes an elongate member 58 that is positionable in the groove so that the inner face 23 of the longitudinal extent is able to fit relatively flatly against a surface of the pew end support. The elongate member 58 may comprise a band, cord, or other element that may be used to secure an ornamental item to the mounting portion.

In one embodiment of the invention (see FIG. 12), the securing portion may include a pair of apertures 62, 63 through which the elongate member 58 may be passed and then secured to an ornamental item.

Optionally, portions of the return extents 32, 33 and free end extents 34, 35 may be formed with a tapering thickness (see FIG. 6) or a tapering width (see FIG. 13), although tapering may reduce the gripping ability of the clip structure.

It should be understood that the various mounting portion configurations and securing portion configurations disclosed herein may be combined to form various embodiments which may have particular advantages to those embodiments.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A clip for supporting ornamental items on a pew, comprising:

a mounting portion for gripping a portion of a pew support, the mounting portion having a pair of opposite faces including an inner face and an outer face, the mounting portion having a pair of side edges and a pair of end edges, the mounting portion comprising:

an elongate longitudinal extent having opposite end regions;

a pair of transverse extents, each of the transverse extents extending from one of the end regions of the longitudinal extent in a generally transverse orientation to the longitudinal extent;

a pair of return extents, each of the return extents extending from one of the transverse extents, each of the return extents extending towards each other; and a pair of free end extents, each of the free end extents extending from one of the return extents; and a securing portion forming a hook for securing an ornamental item to the mounting portion, the hook opening toward a side edge of the mounting portion such that the hook portion is orientatable upwardly when the mounting portion grips a vertically extending portion of the pew support;

wherein each of the transverse extents, the return extents, and the free end extents arcuate such that a group of connected transverse, return and free end extents forms a portion of a circle;

wherein the hook comprises a securing arm with a first end mounted on the mounting portion and a second end free of the mounting portion, and wherein the free second end of the securing arm extends past one of the side edges of the mounting portion.

2. The clip of claim 1 wherein the pair of transverse extents extend outwardly from the inner face of the longitudinal extent, each of the transverse extents having opposite end regions, a first one of the end regions of each of the transverse extents being joined to one of the end regions of the longitudinal extent.

3. The clip of claim 1 wherein each of the end edges of the mounting portion is located on one of the free end extents, and a gap is formed between the end edge on the free end extent and the longitudinal extent.

4. The clip of claim 3 wherein a distance of the gap is approximately one-half of a distance of a farthest extent of the return extents from the longitudinal extent.

5. The clip of claim 1 wherein the securing arm has a first end mounted on the mounting portion and a second end being free of connection to the mounting portion, the second end being biased against the outer face of the mounting portion.

6. A clip for supporting ornamental items on a pew, comprising:

a mounting portion for gripping a portion of a pew support, the mounting portion having a pair of opposite faces including an inner face and an outer face, the mounting portion having a pair of side edges and a pair of end edges, the mounting portion comprising:

an elongate longitudinal extent having opposite end regions;

a pair of transverse extents, each of the transverse extents extending from one of the end regions of the longitudinal extent in a generally transverse orientation to the longitudinal extent;

a pair of return extents, each of the return extents being connected to one of the transverse extents, each of the return extents extending towards each other; and a securing portion for removably securing an ornamental item on the mounting portion, the securing portion having a first end being mounted on the mounting portion adjacent to a first one of the side edges of the mounting portion and a second end free of connection to the mounting portion and being biased against the outer face of the mounting portion, the free second end of the securing portion extending past a second one of the side edges of the mounting edge.

7. The clip of claim 6 wherein the mounting portion includes a pair of free end extents, each of the free end extents extending between one of the transverse extents and one of the free end extents, each of the return extents extending from one of the transverse extents and towards each other.

8. The clip of claim 1 wherein the second end of the securing arm extends toward one of the side edges of the mounting portion.

9. The clip of claim 1 wherein one of the side edges of the mounting portion defines a plane, and the free second end of the securing arm extends through the plane of the side edge.

10. The clip of claim 6 wherein one of the side edges of the mounting portion defines a plane, and the free second end of the securing portion extends through the plane of the side edge.

11. The clip of claim 10 wherein the securing portion abuts against the mounting portion at a junction of the outer face and the second side edge of the mounting portion.

12. A clip for supporting ornamental items on a pew comprising:

a mounting portion for gripping a portion of a new support, the mounting portion having a pair of opposite faces including an inner face and an outer face, the mounting portion having a pair of side edges and a pair of end edges, the mounting portion comprising:

an elongate longitudinal extent having opposite end regions;

a pair of transverse extents, each of the transverse extents extending from one of the end regions of the longitudinal extent in a generally transverse orientation to the longitudinal extent;

a pair of return extents, each of the return extents extending from one of the transverse extents, each of the return extents extending towards each other; and a pair of free end extents, each of the free end extents extending from one of the return extents, and a securing portion forming a hook for securing an ornamental item to the mounting portion, the hook opening toward a side edge of the mounting portion such that the hook portion is orientatable upwardly when the mounting portion grips a vertically extending portion of the new support;

wherein each of the transverse extents, the return extents, and the free end extents are arcuate such that a group of connected transverse, return and free end extents forms a portion of a circle;

wherein the securing portion is mounted on the mounting portion adjacent to a first one of the side edges and the securing portion extends across the outer face of the mounting portion and abuts against a second one of the side edges of the mounting portion.

13. The clip of claim 12 wherein the securing portion abuts against the mounting portion at a junction of the outer face and the second side edge of the mounting portion.

14. The clip of claim 1 wherein the mounting portion is formed of a resiliently flexible material, the pair of side edges being oriented substantially parallel to each other, the mounting portion having a pair of end edges, the pair of end edges each extending substantially perpendicularly to the side edges;

wherein the longitudinal extent is substantially planar;

wherein the pair of transverse extents extend outwardly from the inner face of the longitudinal extent, each of the transverse extents being arcuate, each of the transverse extents having opposite end regions, a first one of the end regions of each of the transverse extents being joined to one of the end regions of the longitudinal extent;

wherein each of the return extents extending generally parallel to the longitudinal extent, each of the return extents extending from a second one of the end regions of one of the transverse extents, each of the return extents being arcuate;

wherein each of the free end extents extending inwardly from one of the return extents, each of the free end extents being oriented substantially perpendicular to the longitudinal extent, each of the end edges of the mounting portion being located on one of the free end extents, a gap being formed between the end edge on the free end extent and the longitudinal extent;

wherein a distance of the gap being approximately one-half of a distance of a farthest extent of the return extents from the longitudinal extent; and wherein the securing portion being located on the outer face of the mounting portion, the securing portion comprising a securing arm for holding a portion of an ornamental item against the mounting portion, the securing arm having a first end mounted on the mounting portion and a second end being free of connection to the mounting portion, the securing arm generally converging toward the outer face at the second end thereof to form a channel therebetween for receiving a portion of an ornamental item, the second end of the securing arm being biased against the mounting portion.

\* \* \* \* \*